May 28, 1929. O. BUSE 1,714,657
SULPHUR BURNING APPARATUS
Filed Nov. 2, 1925
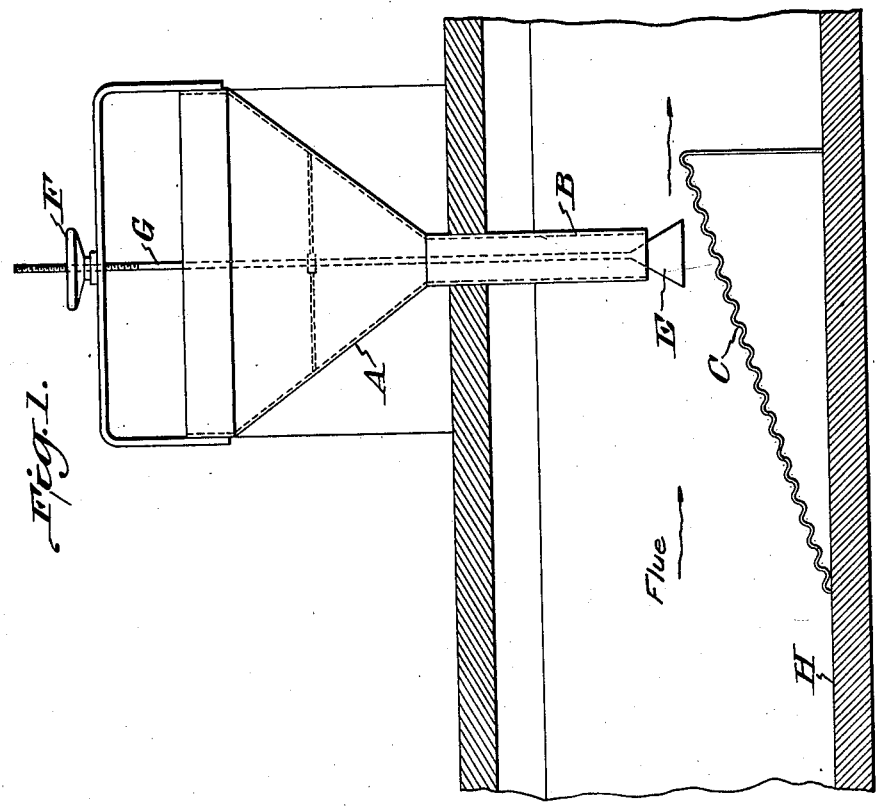
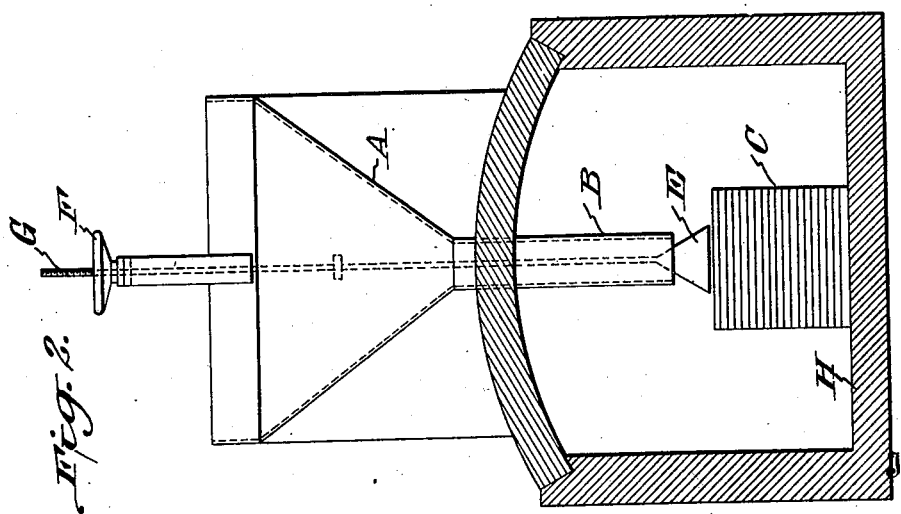

Patented May 28, 1929.

1,714,657

UNITED STATES PATENT OFFICE.

OTTO BUSE, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE.

SULPHUR-BURNING APPARATUS.

Application filed November 2, 1925. Serial No. 66,384.

The present invention relates to a process and apparatus for the production of gas of a high and uniform sulphur dioxid content from the sulphurous gases of low or variable or both low and variable sulphur dioxid content obtained in commercial operations such as the roasting of sulphid ores.

In various manufacturing operations utilizing sulphur dioxid, for instance, in the production of sulphuric acid, sulphite pulp, and the like, it is important to use a gas having a uniform and high sulphur dioxid content. The use of a gas having these characteristics is of great advantage, since the use of a dilute gas makes the handling of a large amount of unproductive material and a corresponding increase in capacity of apparatus necessary, while fluctuations in the sulphur dioxid strength of the gas result in irregular operating conditions and make it difficult to utilize the gas to the best advantage.

The invention provides for the production of a gas of a uniform and high sulphur dioxid content in a simple and efficient manner by introducing melted elemental sulphur into the gases of low or variable or both low and variable sulphur dioxid content where it burns, forming sulphur dioxid which supplements the sulphur dioxid content of the gases, the quantity of melted elemental sulphur so introduced being controlled with reference to the sulphur dioxid content of the gases under treatment and the sulphur dioxid content desired in the product.

A feature of my invention resides in means whereby sulphur is first melted by the heat from the treated gas and is then brought into intimate contact therewith.

It will be evident that my invention may be applied with advantage to sulphur dioxid-containing gases derived from various sources, but for the purpose of illustration it will be described as applied to gases produced by ore burners of the Mathiesen-Hegeler kiln type operating on a pyritic ore. In the operation of the Mathiesen-Hegeler kiln the ore, carried on a series of shelves, is rabbled or raked periodically at intervals of about one hour. At the time of raking, fresh surfaces of ore are presented which results in a sharp rise in the sulphur dioxid content of the gases, following which there is a gradual drop in the sulphur dioxid present until just before the time for the next raking operation when it reaches its lowest value.

In the following detailed description of the invention reference will be made to the accompanying drawings in which, Fig. 1 is a longitudinal section of a sulphurous gas flue with the sulphur feeding and distributing devices of my invention shown in side elevation; and Fig. 2 is a transverse section of the sulphurous gas flue with the sulphur feeding and distributing devices in front elevation.

Referring to the drawings, H is a flue adapted to carry sulphurous gases from a Mathiesen-Hegeler kiln or similar sulphurous gas-producing device (not illustrated), A is a hopper which may be conical or of other suitable shape adapted to contain elemental sulphur, B is a pipe extending from the lower end of the hopper A through the upper wall of the flue H, E is a cone valve carried by the shaft G and controlled by the hand wheel F, adapted to close the lower end of the feed pipe B, and C is an inclined plate having transverse corrugations adapted to receive the melted sulphur delivered by the pipe B and to spread it over a relatively large surface in the path of the sulphurous gases.

In operation elemental sulphur is supplied to the hopper A from which it falls down into the pipe B and is melted by the heat of the sulphurous gases passing through the flue H and flows through the cone valve E onto the corrugated plate C. The action of the sloping corrugated plate is to spread the melted sulphur so that it presents a relatively large surface to the sulphurous gases. The sulphur on the plate C burns in the sulphurous gases, forming $SO_2$ which is added to the sulphur dioxid content thereof. If it is merely desired to enrich the sulphurous gases the supply of sulphur to the plate C may be constant, but for producing a gas of uniform sulphur dioxid content the supply of sulphur is varied with variations in the sulphur dioxid content of the gases. For instance, just after the ore in a Mathiesen-Hegeler kiln has been stirred the supply of sulphur may be stopped or cut to the minimum, and then as the sulphur dioxid content of the gases gradually falls the supply of sulphur is correspondingly increased so that the sulphur dioxid content of the resultant gas is maintained fairly constant.

As is apparent, the movement of the valve E may be controlled by automatic apparatus sensitive to changes in the sulphur dioxid content of the sulphurous gases.

I claim:—

Sulphur burning apparatus comprising a gas conduit, an inclined corrugated plate in said conduit, and means for delivering melted sulphur onto said plate.

In testimony whereof, I affix my signature.

OTTO BUSE.